(12) United States Patent  (10) Patent No.: US 9,313,728 B2
Furuya  (45) Date of Patent: Apr. 12, 2016

(54) COMMUNICATION TERMINAL, COMMUNICATION SYSTEM AND COMMUNICATION METHOD

(75) Inventor: Tomoki Furuya, Minato-ku (KR)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 147 days.

(21) Appl. No.: 13/578,476

(22) PCT Filed: Feb. 7, 2011

(86) PCT No.: PCT/JP2011/052504
§ 371 (c)(1),
(2), (4) Date: Aug. 10, 2012

(87) PCT Pub. No.: WO2011/111452
PCT Pub. Date: Sep. 15, 2011

(65) Prior Publication Data
US 2012/0320744 A1 Dec. 20, 2012

(30) Foreign Application Priority Data
Mar. 10, 2010 (JP) .................... 2010-052634

(51) Int. Cl.
H04W 48/18 (2009.01)
H04L 29/06 (2006.01)
H04W 4/18 (2009.01)

(52) U.S. Cl.
CPC ........... *H04W 48/18* (2013.01); *H04L 29/0604* (2013.01); *H04W 4/18* (2013.01)

(58) Field of Classification Search
CPC ..... H04W 28/06; H04W 36/14; H04W 88/06; H04W 36/0083; H04W 72/02; H04W 72/08; H04W 4/18; H04W 28/064; H04W 36/0088; H04W 36/04; H04W 17/382; H04W 36/00; H04W 36/165; H04W 36/22; H04W 36/16; H04W 36/38; H04L 1/0007; H04L 1/0068; H04L 69/04; H04B 17/382; H04M 7/30
USPC ......................... 370/255, 282, 315, 331, 466; 375/240.25; 455/72, 435.1, 436
See application file for complete search history.

(56) References Cited

U.S. PATENT DOCUMENTS 6,947,483 B2 * 9/2005 Engwer .................... 375/240
7,027,816 B2 * 4/2006 Kikuma et al. ........... 455/444

(Continued)

FOREIGN PATENT DOCUMENTS

JP 2004-129163 A 4/2004
JP 2004-158935 A 6/2004

(Continued)

OTHER PUBLICATIONS

International Search Report of PCT/JP2011/052504 dated May 10, 2011.

(Continued)

*Primary Examiner* — Gary Mui
*Assistant Examiner* — Michael Phillips

(57) ABSTRACT

A communication terminal is used in a wireless communication environment which involves a plurality of coexisting communication processes with upper limit values being set respectively therein for amounts of data to be transmitted. The communication terminal includes a compressor which compresses data to be transmitted, and a compression controller which controls the compressor to compress the data if the amount of the data to be transmitted is equal to or greater than the upper limit value set depending on one of the communication processes which is to be used to transmit the data.

12 Claims, 4 Drawing Sheets

(56) References Cited

U.S. PATENT DOCUMENTS

| | | | |
|---|---|---|---|
| 8,295,615 B2* | 10/2012 | Celi, Jr. | 382/232 |
| 8,643,513 B2* | 2/2014 | Fallon | 341/51 |
| 2001/0054131 A1* | 12/2001 | Alvarez et al. | 711/105 |
| 2003/0031143 A1* | 2/2003 | Faerber | 370/331 |
| 2004/0042506 A1* | 3/2004 | Fallon et al. | 370/521 |
| 2004/0252656 A1* | 12/2004 | Shiu et al. | 370/328 |
| 2005/0085258 A1 | 4/2005 | Ishii et al. | |
| 2005/0265284 A1* | 12/2005 | Hsu et al. | 370/331 |
| 2006/0140117 A1* | 6/2006 | Aerrabotu et al. | 370/232 |
| 2006/0246890 A1* | 11/2006 | Yasuda et al. | 455/425 |
| 2008/0101220 A1* | 5/2008 | Kim et al. | 370/229 |
| 2008/0253330 A1* | 10/2008 | Bartlett | 370/331 |
| 2008/0267219 A1* | 10/2008 | Christoffersson et al. | 370/477 |
| 2009/0046639 A1* | 2/2009 | Cai et al. | 370/329 |
| 2009/0089454 A1* | 4/2009 | Huggahalli et al. | 709/247 |
| 2009/0161547 A1* | 6/2009 | Riddle et al. | 370/236 |
| 2009/0180429 A1* | 7/2009 | Stevens et al. | 370/329 |
| 2009/0202022 A1* | 8/2009 | Kaczman et al. | 375/319 |
| 2009/0219860 A1* | 9/2009 | Tanno et al. | 370/328 |
| 2010/0118842 A1* | 5/2010 | Kalhan | 370/338 |
| 2010/0159936 A1* | 6/2010 | Brisebois et al. | 455/450 |
| 2010/0248643 A1* | 9/2010 | Aaron et al. | 455/68 |
| 2012/0194362 A1* | 8/2012 | Fallon et al. | 341/87 |
| 2012/0254417 A1* | 10/2012 | Luna | 709/224 |

FOREIGN PATENT DOCUMENTS

| | | |
|---|---|---|
| JP | 2005-124219 A | 5/2005 |
| JP | 2008-258956 A | 10/2008 |
| JP | 2009130843 A | 6/2009 |
| JP | 2009-188983 A | 8/2009 |
| JP | 2009-267997 A | 11/2009 |

OTHER PUBLICATIONS

3 GPP TS 25.304 V9.0.0 (Dec. 2009) Technical Specification. 3rd Generation Partnership Project; Technical Specification Group Radio Access Network; User Equipment (UE) procedures in idle mode and procedures for cell reselection in connected mode (Release 9) http://www.3gpp.org.

* cited by examiner

Fig.1 RELATED ART
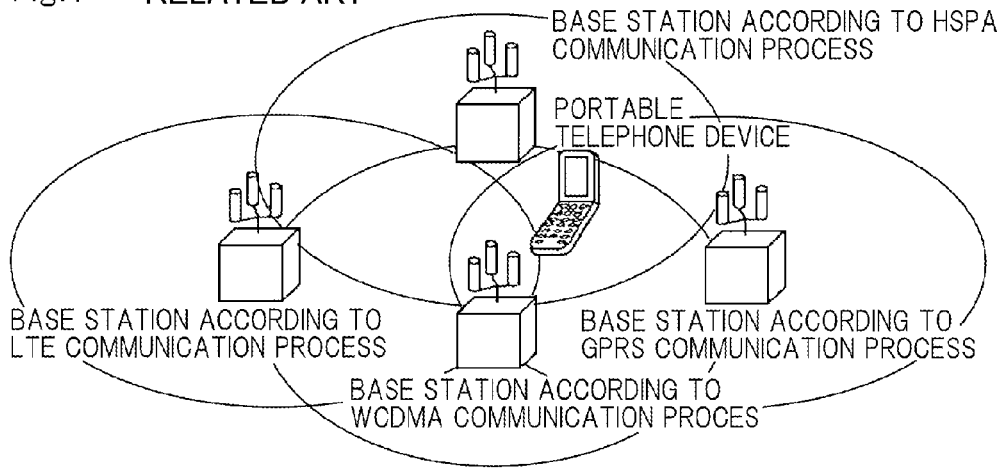
Fig.2
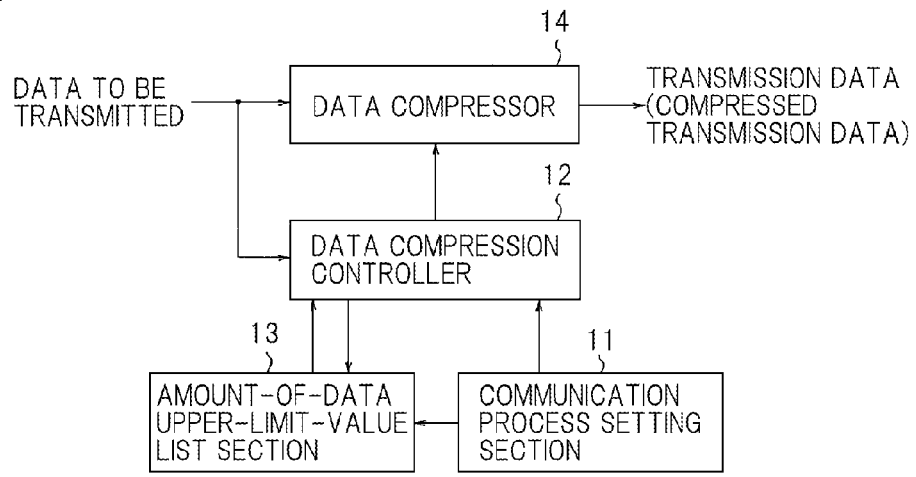
Fig.3
| COMMUNICATION PROCESS | UPPER LIMIT VALUES FOR AMOUNTS OF DATA TO BE TRANSMITTED |
|---|---|
| GPRS | 500kbyte |
| WCDMA | 5Mbyte |
| HSPA | 50Mbyte |
| LTE | 5Gbyte |

COMMUNICATION TERMINAL, COMMUNICATION SYSTEM AND COMMUNICATION METHOD

CROSS REFERENCE TO RELATED APPLICATIONS

This application is a National Stage of International Application No. PCT/JP2011/052504 filed Feb. 7, 2011, claiming priority based on Japanese Patent Application No. 2010-052634 filed Mar. 10, 2010, the contents of all of which are incorporated herein by reference in their entirety.

TECHNICAL FIELD

The present invention relates to a technology for performing data communications such as electronic mail, Internet access, etc. in the environment of wireless communications involving a plurality of coexisting communication processes and in which any one of the communication processes.

BACKGROUND ART

Mobile communication devices, typically portable telephone terminals, have in recent years been undergoing efforts to make themselves compatible with HSPA (High Speed Packet Access) for high-speed packet communications. Efforts have also been made to realize mobile communication networks for higher communication speeds by introducing LTE (Long Term Evolution) for packet communications higher in speed than HSPA. In order to introduce a new communication process, it is necessary to construct a network infrastructure compatible with the new communication process. However, it is difficult to replace existing facilities all at once with those of the new network infrastructure. While the new communication process is being introduced, therefore, a situation occurs wherein both the new communication process and the existing communication process exist together.

Generally, mobile communication devices are unable to communicate with each other unless terminals and base stations operate according to compatible communication processes. Consequently, a terminal which is not compatible with the new communication process cannot communicate in an area that includes a base station that operates based on the new communication process, and hence cannot benefit from the new communication process. Conversely, during a transient period wherein the number of base station areas that operate according to the new communication process is expanding, terminals which are compatible with only the new communication process that is capable of high-speed communication may be used in limited areas compared with terminals according to the old communication processes.

FIG. 1 is a diagram showing by way of example a wireless communication environment involving a plurality of coexisting communication processes.

For handling the above situation in a wireless communications environment involving a plurality of coexisting communication processes such as GPRS (General Packet Radio Service), WCDMA (Wideband Code Division Multiple Access), HSPA, LTE, etc., as shown in FIG. 1, research has been conducted on a technology (multimode) for performing data communications such as electronic mail, Internet access, etc. A technology called multimode LTE is compatible with a plurality of communication processes including third-generation WCDMA, GPRS, etc. as well as LTE. For example, a terminal compatible with an LTE/WCDMA multimode can communicate according to the LTE communication process when in an LTE base station area, and can communicate according to the WCDMA communication process when moved to a WCDMA base station area.

Relevant technologies applicable to a wireless communication environment that includes a plurality of coexisting communication processes are disclosed in Patent documents 1, 2.

According to Patent document 1, there is disclosed a technology for avoiding a reduction in the throughput due to biased reliance on a certain communication process in a wireless communication environment involving a plurality of coexisting different communication processes which are independent of each other.

According to Patent document 2, there is disclosed a technology which is free of a compressing or terminating mechanism in an exchange center (or a service node) as a compression process for making a transmission bandwidth more efficient. According to the disclosed technology, instead, a compressing or terminating mechanism is provided in a wireless network controller to thereby process protocol data packets.

BACKGROUND ART DOCUMENTS

Patent documents

Patent document 1: JP2008-258956A
Patent document 2: JP2005-124219A

SUMMARY OF THE INVENTION

Problems to be Solved by the Invention

When large-capacity data communications are performed using multimode-compatible terminals, sufficient bands may not be available depending on the place where communications take place and the communication process according to which communications take place, and prolonged communications may be required in base station areas which are not compatible with high-speed large-capacity communications. Consequently, problems such as a reduction in the power consumption performance of portable telephone terminals and an increase in the call cut-off rate due to a change in the propagation environment are solved.

The technology disclosed in Patent document 1 controls the communication system so as to equalize the usage rates of resources of coexisting wireless communication technologies in an overall group of wireless resources. According to the disclosed technology, however, when large-capacity data in excess of the limitation on the usage rate, that is assigned to a certain wireless communication resource, are transmitted, then the transmission capacity according to the corresponding communication process cannot be increased. Therefore, the problem in which a long amount of time is required to transmit large capacity data remains unsolved.

The technology disclosed in Patent document 2 compresses signals unconditionally in a wireless network controller. According to the disclosed technology, since a low-speed signal that does not need to be compressed is compressed, the problem of a commensurate wasteful consumption of resources (CPU [Central Processing Unit] processing capability, power consumption, etc.) also remains unsolved.

It is an object of the present invention to provide a communication terminal, a communication system, and a communication method which are capable of preventing prolonged data communications in order to solve the above problems in a wireless communications environment that involves a plurality of coexisting communication processes that include GPRS, WCDMA, HSPA, LTE, etc., when data communications such as electronic mail, Internet access, etc. are performed, and in which any one of the communication processes is used.

Means for Solving the Problems

According to the present invention, there is provided a communication terminal for use in a wireless communication environment which involves a plurality of coexisting communication processes with upper limit values being set respectively therein for amounts of data to be transmitted, including:

a compressor which compresses data to be transmitted; and a compression controller which controls said compressor to compress said data if the amount of the data to be transmitted is equal to or greater than the upper limit value set depending on one of the communication processes which is to be used to transmit the data.

According to the present invention, there is also provided a communication system having a wireless communication environment which involves a plurality of coexisting communication processes with upper limit values being set respectively therein for amounts of data to be transmitted, wherein if an amount of data to be transmitted by a terminal is equal to or greater than an upper limit value set depending on one of the communication processes which is to be used to transmit the data, the terminal searches for a base station corresponding to one of the communication processes which has a greater transmission capacity per unit time than a base station with which the terminal is currently communicating, and, if the base station is detected, the terminal switches to the detected base station for transmitting the data; and if the amount of the data to be transmitted is equal to or greater than the upper limit value set depending on one of the communication processes which is to be used to communicate with the detected base station, the terminal compresses said data and transmits the compressed data.

According to the present invention, there is further provided a communication method to be carried out by a communication terminal for use in a wireless communication environment which involves a plurality of coexisting communication processes with upper limit values being set respectively therein for amounts of data to be transmitted, including:

the step of judging whether or not an amount of data equal to or greater than one of said upper limit values is to be transmitted;

the step of searching for a base station corresponding to one of the communication processes which has a greater transmission capacity per unit time than a base station with which the communication terminal is currently communicating, if the amount of data equal to or greater than said one of the upper limit values is to be transmitted;

the step of, if the base station is detected, switching to the detected station for transmitting the data; and the step of compressing said data and transmitting the compressed data if said amount of data is equal to or greater than the upper limit value set depending on one of the communication processes which is to be used to communicate with the detected base station.

Advantages of the Invention

As described above, the present invention can be used for data communications such as electronic mail, Internet access, etc. in a wireless communication environment involving a plurality of coexisting communication processes including GPRS, WCDMA, HSPA, LTE, etc., using any one of the communication processes. Upper limit values for amounts of data to be transmitted are set depending on the transmission capacities per unit time according to the communication processes. If the data to be transmitted are equal to or greater than the upper limit value according to the communication process used, then the data to be transmitted are compressed and then transmitted. In this manner, amounts of data that are optimum for the respective communication processes can be transmitted, thereby preventing prolonged data communications from taking place. Consequently, the above problems are solved.

BRIEF DESCRIPTION OF THE DRAWINGS

FIG. 1 is a diagram showing by way of example a wireless communication environment involving a plurality of coexisting communication processes FIG. 2 is a block diagram of a communication terminal according to a first exemplary embodiment of the invention;

FIG. 3 is a diagram showing upper limit values for amounts of data to be transmitted according to various communication processes, which are set in an amount-of-data upper-limit-value list section shown in FIG. 2;

BEST MODE FOR CARRYING OUT THE INVENTION (First Exemplary Embodiment)

FIG. 2 is a block diagram of a communication terminal according to a first exemplary embodiment of the invention.

As shown in FIG. 2, the communication terminal according to the present exemplary embodiment includes communication process setting section 11 for a portable telephone terminal as the communication terminal to select one communication process from among a plurality of communication processes, amount-of-data upper-limit-value list section 13 which associates respective upper limit values for amounts of data with the communication processes, data compressor 14 for compressing data to be transmitted, and data compression controller 12 for determining whether or not data to be transmitted are to be compressed.

When the portable telephone terminal thus constructed starts to transmit data, communication process setting section 11 indicates a communication process to be used for data communications to data compression controller 12. Data compression controller 12 then confirms upper limit values for amounts of data to be transmitted according to the respective communication processes, which are set in amount-of-data upper-limit-value list section 13.

FIG. 3 is a diagram showing upper limit values for amounts of data to be transmitted according to various communication processes, which are set in amount-of-data upper-limit-value list section 13 shown in FIG. 2.

As shown in FIG. 3, amount-of-data upper-limit-value list section 13 shown in FIG. 2 sets therein upper limit values for amounts of data to be transmitted according to various communication processes.

Data compression controller 12 compares data to be transmitted with the upper limit amount according to the communication process indicated by communication process setting section 11. If the data to be transmitted are greater, then data compression controller 12 instructs data compressor 14 to compress the data to be transmitted.

When data compressor 14 receives an instruction to compress the data to be transmitted from data compression controller 12, data compressor 14 compresses the data to be transmitted, and sends the compressed data as transmission data to a next process (not shown) for transmission.

A communication method to be carried out by the above portable telephone terminal will be described below with reference to a flowchart.

Figure 4:
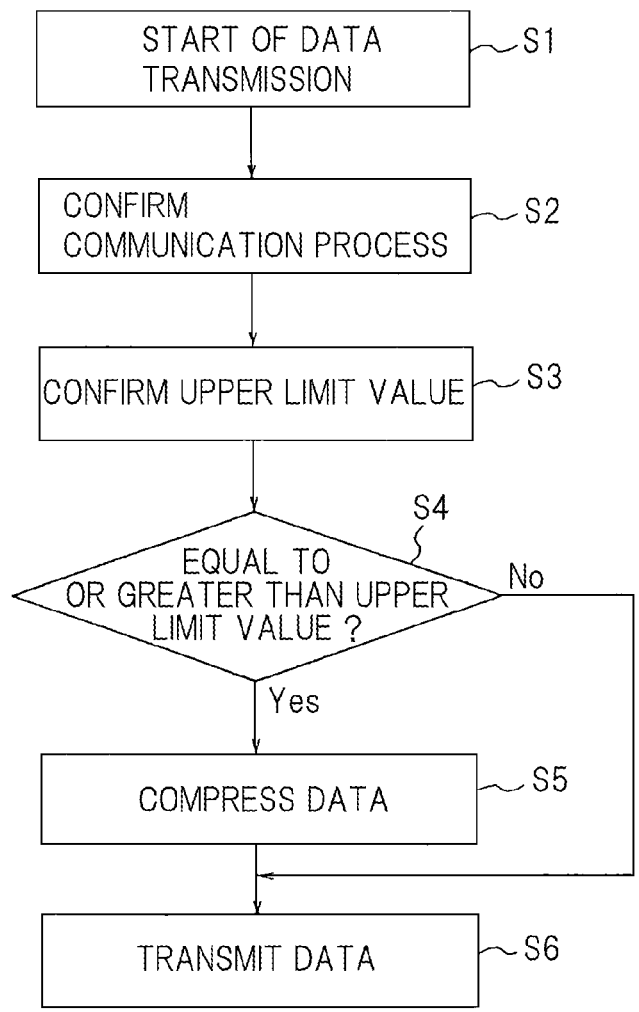
FIG. 4 is a flowchart illustrative of a communication method to be carried out by a portable telephone terminal shown in FIG. 2.

FIG. 4 is a flowchart illustrative of a communication method to be carried out by the portable telephone terminal shown in FIG. 2.

In step S1, the portable telephone terminal starts to send the data. At this time, communication process setting section 11 indicates to data compression controller 12 the communication process that is to be used for data communication.

In step S2, data compression controller 12 confirms the communication process to be used for data communications. In step S3, data compression controller 12 confirms the upper limit value depending on the communication process to be used, among the upper limit values for amounts of data to be transmitted according to various communication processes as shown in FIG. 3.

In step S4, data compression controller 12 compares the amount of the data to be transmitted with the upper limit value confirmed in step S3. If the data to be transmitted are equal to or greater than the upper limit value, then data compressor 14 compresses the data to be transmitted in step S5, and transmits the compressed data in step S6. For example, if the data to be transmitted represent an image or the like that is captured by a digital camera which is combined with the portable telephone terminal, then the amount of the data is generally greater as the quality of the data is higher in resolution. If the amount of the data of the image to be transmitted is equal to or greater than the above upper limit value, then data compressor 14 compresses the data into a reduced amount and transmits the compressed data. The compressed data which are transmitted are decompressed by the companion recipient, whereupon the data transmission is completed.

If the amount of data to be transmitted is smaller than the upper limit value confirmed in step S3, then the portable telephone terminal does not compress the data to be transmitted, but transmits the data as is. For example, if the data to be transmitted represent email text comprising short sentences, then the portable telephone terminal transmits the data without compressing it. Therefore, resources (CPU load, power consumption, etc.) for the compression process can be saved.

The compression process for the data may be a lossless data compression process or a lossy data compression process, which may be determined depending on the nature of the data to be handled, etc. If a lossy data compression process is performed, then the companion recipient which has received the data may decompress the data. For example, if the data are high-resolution image data whose image quality is allowed to be deteriorated, then the image data may be compressed by the lossy data compression process within a range below the upper limit value thereby reducing the amount of the data. In this case, the companion recipient may not need to decompress the received data.

The decompression process may be an end-to-end decompression process, i.e., the data compressed by the transmitting terminal may be finally decompressed by the companion recipient. Alternatively, data may be compressed only in a wireless zone, and a file compressed by the portable telephone terminal may be decompressed by the base station and transferred to the final recipient.

As described above, the portable telephone terminal according to the present exemplary embodiment can be used to perform data communications such as electronic mail, Internet access, etc. in a wireless communication environment involving a plurality of coexisting communication processes including GPRS, WCDMA, HSPA, LTE, etc. and in which any one of the communication processes is used. Upper limit values for amounts of data to be transmitted are set depending on the transmission capacities per unit time according to the communication processes. If the data to be transmitted are equal to or greater than the upper limit value according to the communication process used, then the data to be transmitted are compressed and then transmitted. In this manner, amounts of data that are optimum for the respective communication processes can be transmitted, thereby preventing prolonged data communications from taking place. Consequently, problems such as a reduction in the power consumption performance of potable telephone terminals and an increase in the call cutoff rate due to a change in the propagation environment are solved.

(Second Exemplary Embodiment)

Relevant portable telephone terminals select a base station for communicating with a base station having a better communication status according to cell selection or cell reselection prescribed by 3GPP (3rd Generation Partnership Project) TS25.304. In a wireless communication environment involving a plurality of coexisting communication processes, therefore, a portable telephone terminal may not necessarily communicate with a base station which has the greatest transmission capacity per unit time. According to a second exemplary embodiment, when a portable telephone terminal starts to transmit an amount of data which is equal to or greater than the upper limit value, the portable telephone terminal searches for a base station. If the portable telephone terminal detects a base station which has a greater transmission capacity per unit time than the base station where the portable telephone terminal is currently positionally registered, then the portable telephone terminal re-registers its position in the detected base station, and performs data communications through the re-registered base station. Consequently, the process for compressing the amount of data to be transmitted may be omitted depending on the amount of data, and the data communications may be completed within a short period of time, offering the same advantages as the first exemplary embodiment.

Figure 5:
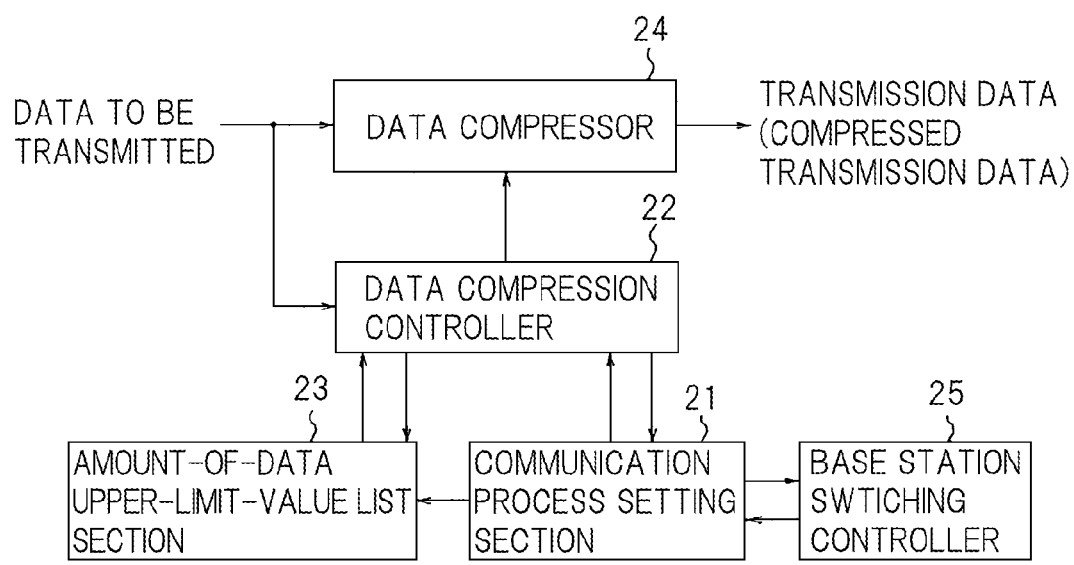
FIG. 5 is a block diagram of a communication terminal according to a second exemplary embodiment of the invention.

FIG. 5 is a block diagram of a communication terminal according to a second exemplary embodiment of the invention.

As shown in FIG. 5, the communication terminal according to the present exemplary embodiment includes communication process setting section 21 for a portable telephone terminal as the communication terminal to select one communication processes from among a plurality ao communication process, amount-of-data upper-limit-value list section 23 which associates respective upper limit values for amounts of data with the communication processes, data compressor 24 for compressing data to be transmitted, data compression controller 22 for determining whether or not data to be transmitted are to be compressed, and base station switching controller 25.

When the portable telephone terminal thus constructed starts to transmit data, communication process setting section 21 indicates to data compression controller 22 the communication process that is to be used for data communications.

Data compression controller 22 then confirms upper limit values for amounts of data to be transmitted according to the respective communication processes, which are set in amount-of-data upper-limit-value list section 23.

Data compression controller 22 compares data to be transmitted with the upper limit amount according to the communication process indicated by communication process setting section 21. If the data to be transmitted are greater, then data compression controller 22 instructs communication process setting section 21 to switch between base stations. Communication process setting section 21 instructs base station switching controller 25 to search for a base station which is compatible with a communication process (e.g., LTE) having the maximum communication capacity from, among the communication processes available for communications, and to attempt to switch to that base station.

If base station switching controller 25 detects a suitable base station and if base station switching is successful, then base station switching controller 25 indicates the successful switching to communication process setting section 21.

Thereafter, data compression controller 22 determines whether or not the data are to be compressed depending on the newly set communication process. Data compressor 14 compresses the data to be transmitted, and sends the compressed data as transmission data to a next process (not shown) for transmission.

A communication method to be carried out by the above portable telephone terminal will be described below with reference to a flowchart.

Figure 6:
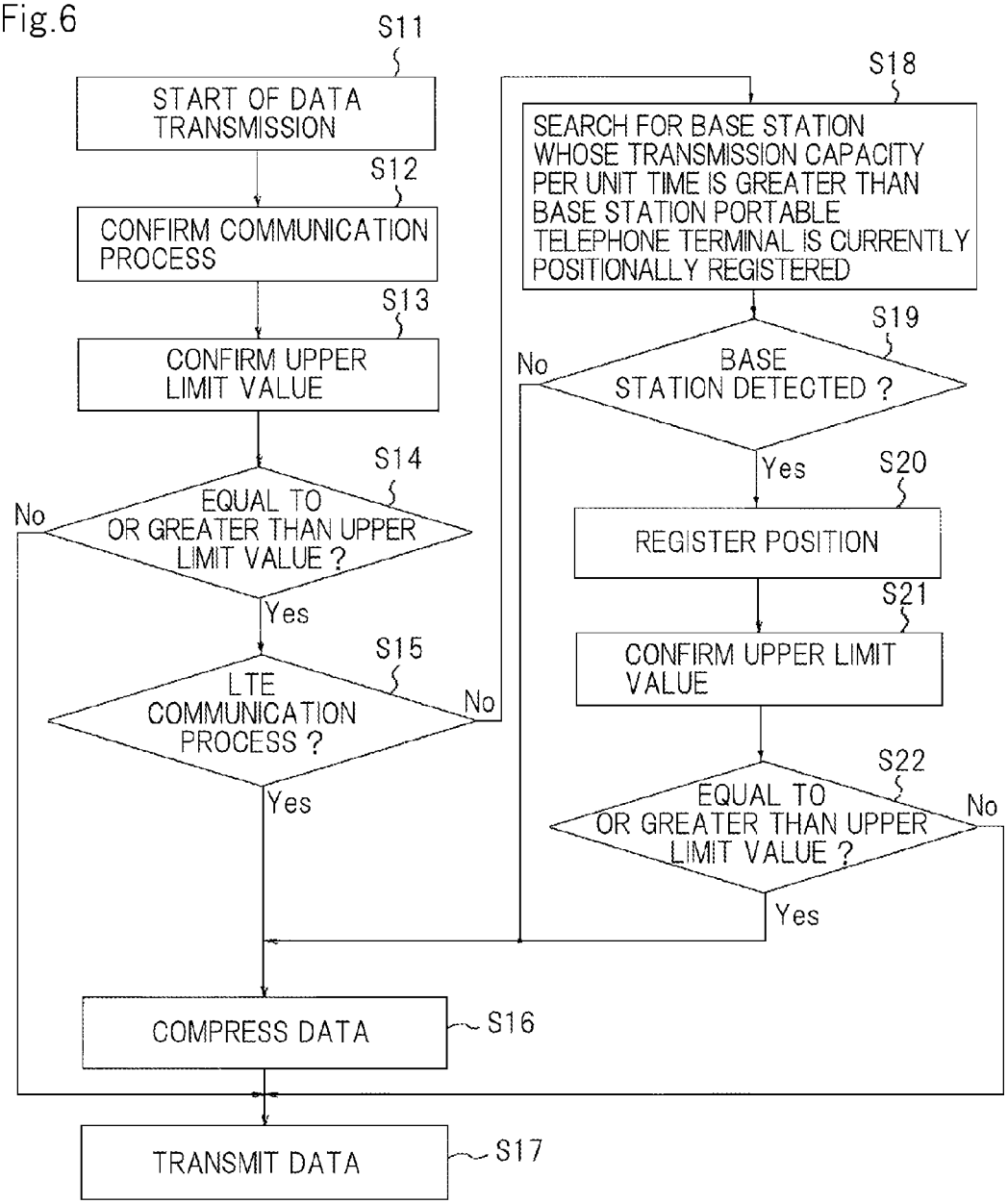
FIG. 6 is a flowchart illustrative of a communication method to be carried out by a portable telephone terminal shown in FIG. 5.

FIG. 6 is a flowchart illustrative of a communication method to be carried out by the portable telephone terminal shown in FIG. 5.

In step S11, the portable telephone terminal starts to send the data. At this time, communication process setting section 21 indicates to data compression controller 22 the communication process that is to be used for data communications.

In step S12, data compression controller 22 confirms the communication process to be used for data communications. In step S13, data compression controller 22 confirms the upper limit value according to the communication process to be used from, among the upper limit values for amounts of data to be transmitted and that is set in amount-of-data upper-limit-value list section 23.

In step S14, data compression controller 22 compares the amount of data to be transmitted with the upper limit value confirmed in step S13. If the data to be transmitted are equal to or greater than the upper limit value, then data compression controller 22 judges whether or not the presently used communication process is LTE in step S15.

If the presently used communication process is the LTE communication process, then data compressor 24 compresses the data to be transmitted in step S16, and transmits the compressed data in step S17.

If the data to be transmitted are smaller than the upper limit value confirmed in step S13, then the portable telephone terminal does not compress the data to be transmitted, but transmits the data as is.

If the presently used communication process is other than the LTE communication process, then base station switching controller 25 searches for a base station which has a greater transmission capacity per unit time than the base station where the portable telephone terminal is currently positionally registered, in step S18.

If base station switching controller 25 detects the base station in step S19, then base station switching controller 25 re-registers its position in the detected base station which has a greater transmission capacity per unit time, thereby switching to the base station for communications in step S20.

Then, in step S21, data compression controller 22 confirms the upper limit value according to the communication process at the positionally re-registered base station. In step S22, data compression controller 22 compares data to be transmitted with the upper limit value confirmed in step S21. If the data to be transmitted are greater, then control goes to step S16. Thereafter, as described above, data compressor 24 compresses the data to be transmitted, and transmits the compressed data.

If the data to be transmitted are smaller than the upper limit value, then the portable telephone terminal does not compress the data to be transmitted, but transmits the data as they are.

If base station switching controller 25 is unable to detect a base station which has a greater transmission capacity per unit time than the base station where the portable telephone terminal is currently positionally registered, then the base station is not changed, and control goes to step S16. Thereafter, as described above, data compressor 24 compresses the data to be transmitted, and transmits the compressed data.

As described above, the portable telephone terminal according to the present exemplary embodiment can be used to perform data communications such as electronic mail, Internet access, etc. in a wireless communications environment involving a plurality of coexisting communication processes including GPRS, WCDMA, HSPA, LTE, etc. and in which any one of the communication processes is used. Upper limit values for amounts of data to be transmitted are set depending on the transmission capacities per unit time according to the communication processes. If the data to be transmitted are equal to or greater than the upper limit value according to the communication process used, then the data to be transmitted are compressed and then transmitted. In this manner, amounts of data that are optimum for the respective communication processes can be transmitted, thereby preventing prolonged data communications from taking place. Consequently, problems such as a reduction in the power consumption performance of potable telephone terminals and an increase in the call cutoff rate due to a change in the propagation environment are solved.

(Third Exemplary Embodiment)

Figure 7:
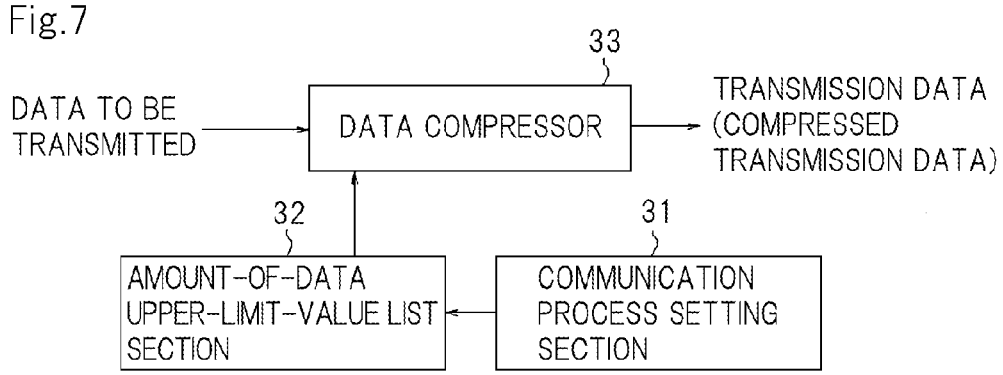
FIG. 7 is a block diagram of a communication terminal according to a third exemplary embodiment of the invention.

FIG. 7 is a block diagram of a communication terminal according to a third exemplary embodiment of the invention.

As shown in FIG. 7, the communication terminal according to the present exemplary embodiment includes communication process setting section 31 for a portable telephone terminal as the communication terminal to select one communication process from among a plurality of communication processes, amount-of-data upper-limit-value list section 32 which associates respective upper limit values for amounts of data with the communication processes, and data compressor 33 for compressing data to be transmitted.

The portable telephone terminal thus constructed sets upper limit values for amounts of data to be transmitted depending on the transmission capacities per unit time according to the communication processes that are associated with the upper limit values for amounts of data according to the respective communication processes by communication process setting section 31 and amount-of-data upper-limit-value list section 32. If data equal to or greater than an upper limit value are to be transmitted, then data compressor 33 compresses the data to be transmitted, and transmits the compressed data. In this manner, amounts of data that are optimum for the respective communication processes can be transmitted, thereby preventing prolonged data communications from taking place. Consequently, problems such as a reduction in the power consumption performance of portable telephone terminals and an increase in the call cutoff rate due to a change in the propagation environment are solved.

In the above three exemplary embodiments, the communication terminal is assumed to be of a configuration that is mainly applicable to portable telephone terminals. However, the communication terminal is also applicable to other terminals insofar as they are wireless communication terminals that can be used in an environment involving a plurality of coexisting communication processes.

In the above three exemplary embodiments, the wireless communication terminal for performing wireless communications within a wireless network is assumed to be a dedicated communication device. However, a personal computer apparatus for performing various data processing processes may be fitted with a board, a card, or the like for performing communication control processes corresponding to the wireless communication sections according to the exemplary embodiments, and the communication control processes may be carried out by the personal computer apparatus. Software for executing the communication control processes may be installed in the personal computer apparatus to perform a pause process for pausing the transmission of a beacon signal or the like. Programs installed in a data processing apparatus such as the personal computer apparatus may be distributed through various recording (storage) mediums such as optical disks, memory cards, etc., or communication means such as the Internet or the like.

(Addendum 1)

A communication terminal for use in a wireless communication environment which involves a plurality of coexisting communication processes with upper limit values being set respectively therein for amounts of data to be transmitted, including:

a compressor which compresses data to be transmitted; and a compression controller which controls said compressor to compress said data if the amount of the data to be transmitted is equal to or greater than the upper limit value set depending on one of the communication processes which is to be used to transmit the data.

(Addendum 2)

The communication terminal according to Addendum 1, further including:

a base station switching controller which, if the amount of the data to be transmitted is equal to or greater than the upper limit value set depending on one of the communication process which is to be used to transmit the data, searches for a base station that uses one of the communication processes which has a greater transmission capacity per unit time than a base station with which the communication terminal is currently communicating, and, which, if the base station is detected, switches to the detected base station for transmitting the data; wherein, if the amount of the data to be transmitted is equal to or greater than the upper limit value set depending on one of the communication processes which is to be used to communicate with the detected base station, said compression controller controls said compressor to compress said data.

(Addendum 3)

The communication terminal according to Addendum 2, wherein said communication processes include an LTE process.

(Addendum 4)

The communication terminal according to Addendum 2 or 3, wherein said compressor compresses said data according to a lossy data compression process.

(Addendum 5)

A communication system having a wireless communication environment which involves a plurality of coexisting communication processes with upper limit values being set respectively therein for amounts of data to be transmitted, wherein if an amount of data to be transmitted by a terminal is equal to or greater than an upper limit value set depending on one of the communication processes which is to be used to transmit the data, the terminal searches for a base station that uses one of the communication processes which has a greater transmission capacity per unit time than a base station with which the terminal is currently communicating, and, if the base station is detected, the terminal switches to the detected base station for transmitting the data; and if the amount of the data to be transmitted is equal to or greater than the upper limit value set depending on one of the communication processes which is to be used to communicate with the detected base station, the terminal compresses said data and transmits the compressed data.

(Addendum 6)

The communication system according to Addendum 5, wherein said communication processes include an LTE process.

(Addendum 7)

The communication system according to Addendum 5 or 6, wherein said data are compressed according to a lossy data compression process.

(Addendum 8)

A communication method to be carried out by a communication terminal for use in a wireless communication environment which involves a plurality of coexisting communication processes with upper limit values being set respectively therein for amounts of data to be transmitted, including:

the step of judging whether or not an amount of data equal to or greater than one of said upper limit values is to be transmitted;

the step of searching for a base station that uses one of the communication processes which has a greater transmission capacity per unit time than a base station with which the communication terminal is currently communicating, if the amount of data equal to or greater than said one of the upper limit values is to be transmitted;

the step of, if the base station is detected, switching to the detected station for transmitting the data; and the step of compressing said data and transmitting the compressed data if said amount of data is equal to or greater than the upper limit value set depending on one of the communication processes which is to be used to communicate with the detected base station.

(Addendum 9)

The communication method according to Addendum 8, wherein said communication processes include an LTE process.

(Addendum 10)

The communication method according to Addendum 8 or 9, wherein said data are compressed according to a lossy data compression process.

(Addendum 11)

A program for enabling a communication terminal for use in a wireless communication environment which involves a plurality of coexisting communication processes with upper limit values being set respectively therein for amounts of data to be transmitted, to carry out:

a procedure for judging whether or not an amount of data equal to or greater than one of said upper limit values is to be transmitted;

a procedure for searching for a base station that uses one of the communication processes which has a greater transmission capacity per unit time than a base station with which the communication terminal is currently communicating, if the amount of data equal to or greater than said one of the upper limit values is to be transmitted;

a procedure for, if the base station is detected, switching to the detected station for transmitting the data; and a procedure for compressing said data and transmitting the compressed data if said amount of data is equal to or greater than the upper limit value set depending on one of the communication processes which is to be used to communicate with the detected base station.

While the present invention has been described above with respect to the exemplary embodiments, the present invention is not limited to the above exemplary embodiments. Various changes that can be understood by those skilled in the art can be made to the configuration and details of the present invention within the scope of the present invention.

This application is based upon and claims the benefit of priority from Japanese Patent Application No. 2010-052634 filed on Mar. 10, 2010, the entire disclosure of which is incorporated herein by reference.

The invention claimed is:

1. A communication terminal for use in a wireless communication environment which involves a plurality of coexisting communication processes with upper limit values being set respectively therein for amounts of data to be transmitted, comprising:

a compressor configured to compress data to be transmitted;

a compression controller configured to:

if the amount of the data to be transmitted is equal to or greater than the upper limit value set depending on a presently used communication process from among the plurality of coexisting communication processes which is to be used to transmit the data and if the presently used communication process is not a maximum capacity communication process, switch the presently used communication process, and, if the amount of the data to be transmitted is equal to or greater than the upper limit value set depending on the switched presently used communication process, control said compressor to compress said data;

if the amount of the data to be transmitted is equal to or greater than the upper limit value set depending on the presently used communication process and if the presently used communication process is the maximum capacity communication process, control said compressor to compress said data; and control said compressor to not compress said data if the amount of the data to be transmitted is smaller than said upper limit value set depending on the presently used communication process; and a base station switching controller which, if the amount of the data to be transmitted is equal to or greater than the upper limit value set depending on the presently used communication process, searches for a base station that uses another communication process which has a greater transmission capacity per unit time than a base station with which the communication terminal is currently communicating, and which, if the base station which has a greater transmission capacity per unit time is detected, is configured to switch to the detected base station that uses another communication process which has a greater transmission capacity per unit time for transmitting the data.

2. The communication terminal according to claim 1, wherein said plurality of coexisting communication processes includes an LTE process.

3. The communication terminal according to claim 1, wherein said compressor compresses said data according to a lossy data compression process.

4. The communication terminal according to claim 1, wherein the coexisting communication processes having the maximum communication capacity is a Long Term Evolution (LTE) process.

5. A communication system having a wireless communication environment which involves a plurality of coexisting communication processes with upper limit values being set respectively therein for amounts of data to be transmitted, wherein if an amount of data to be transmitted by a terminal is equal to or greater than an upper limit value set depending on a presently used communication process from among the plurality of coexisting communication processes which is to be used to transmit the data, the terminal is configured to:

when the presently used communication process is a maximum capacity communication process, compress said data and transmit the compressed data;

when the presently used communication process is not the maximum capacity communication process, search for a base station that uses another communication process from among the plurality of coexisting communication processes which has a greater transmission capacity than the presently used communication process, and, if the base station which has a greater transmission capacity is detected, switch to the detected base station for transmitting the data;

if the amount of the data to be transmitted is equal to or greater than an upper limit value set depending on the another communication process, compress said data and transmit the compressed data; and if the amount of the data to be transmitted is less than the upper limit value set depending on the another communication process, not compress said data and transmit the uncompressed data.

6. The communication system according to claim 5, wherein said plurality of coexisting communication processes includes an LTE process.

7. The communication system according to claim 5, wherein said data are compressed according to a lossy data compression process.

8. The communication system according to claim 5, wherein the coexisting communication processes having the maximum communication capacity is a Long Term Evolution (LTE) process.

9. A communication method to be carried out by a communication terminal for use in a wireless communication environment which involves a plurality of coexisting communication processes with upper limit values being set respectively therein for amounts of data to be transmitted, the upper limit values corresponding to respective communication capacities per unit time of the plurality of coexisting communication processes, and a maximum capacity communication process having a greatest respective communication capacity among the plurality of coexisting communication processes, the communication method comprising:

judging whether or not an amount of data equal to or greater than the upper limit value set depending on a presently used communication process from among the plurality of coexisting communication processes;

if an amount of data to be transmitted by the communication terminal is equal to or greater than the upper limit value set depending on the presently used communication process:

determining that the presently used communication process is the maximum capacity communication process or that the presently used communication process is not the maximum capacity communication process;

compressing, in response to the determination that the presently used communication process is the maximum capacity communication process, said data;

searching, in response to the determination that the presently used communication process is not the maximum capacity communication process, for a base station that uses another communication process from among the plurality of coexisting communication processes which has a greater transmission capacity than the presently used communication process;

switching, if the base station which has a greater transmission capacity is detected, to the detected base station for transmitting the data, and compressing said data and transmitting the compressed data if said amount of data is equal to or greater than an upper limit value set depending on the another communication process; and switching, if the base station which has a greater transmission capacity is detected, to the detected base station, and not compressing said data and transmitting data that has not been compressed if said amount of the data is smaller than said upper limit value set depending on the another communication process.

10. The communication method according to claim 9, wherein said plurality of coexisting communication processes includes an LTE process.

11. The communication method according to claim 9, wherein said data are compressed according to a lossy data compression process.

12. The communication method according to claim 9, wherein the coexisting communication processes having the maximum communication capacity is a Long Term Evolution (LTE) process.

* * * * *